United States Patent [19]
Kawai et al.

[11] Patent Number: 6,137,951
[45] Date of Patent: Oct. 24, 2000

[54] IMAGE PROCESSING APPARATUS HAVING PLURAL MODES DEPENDENT UPON SIGNAL QUALITY

[75] Inventors: Kenji Kawai, Tokyo; Koji Takahashi, Chigasaki, both of Japan

[73] Assignee: Canon Kabushiki Kaisha, Japan

[21] Appl. No.: 08/302,254

[22] Filed: Sep. 8, 1994

[30] Foreign Application Priority Data

Sep. 17, 1993 [JP] Japan ..................................... 5-255106
Nov. 8, 1993 [JP] Japan ..................................... 5-278429

[51] Int. Cl.[7] ....................................................... H04N 5/95
[52] U.S. Cl. ............................ 386/87; 360/73.08; 386/86
[58] Field of Search ..................................... 358/335, 342, 358/310; 360/8, 9–1, 10.1–10.3, 33.1, 48, 69, 70–71, 73.07, 73.01, 73.06, 73.08; 386/80–81, 68, 69, 86–87; H04N 5/76, 5/95

[56] References Cited

U.S. PATENT DOCUMENTS 5,239,429  8/1993  Hoshi ........................................ 386/80
5,262,867  11/1993  Kojima ..................................... 358/906
5,287,432  2/1994  Tomitaka .................................. 395/61
5,305,113  4/1994  Iwamura et al. ......................... 358/335
5,371,602  12/1994  Tsuboi et al. ........................... 358/335
5,424,886  6/1995  Tomitaka ............................. 360/77.01
5,434,673  7/1995  Inove et al. ............................. 358/335
5,758,010  5/1998  Ando ........................................ 386/87

*Primary Examiner*—Wendy Garber
*Assistant Examiner*—Vincent F. Boccio
*Attorney, Agent, or Firm*—Fitzpatrick, Cella, Harper & Scinto

[57] ABSTRACT

An image reproducing apparatus evaluating image signal quality includes a reproducing unit for reproducing an image signal, an evaluation unit for evaluating a quality value of the reproduced image signal, and a control unit for controlling the reproducing unit based on the evaluation of the evaluation unit. Preferably, the evaluated quality value relates to one or more of the level of the reproduced image signal, the number of sync blocks in the reproduced image signal, or the error rate of codes of the reproduced image signal. Preferably, the speed of the recording medium can be controlled to provide a quality image at the highest reproducing speed. At higher speeds, only ID data may be displayed.

22 Claims, 12 Drawing Sheets

IMAGE PROCESSING APPARATUS HAVING PLURAL MODES DEPENDENT UPON SIGNAL QUALITY

BACKGROUND OF THE INVENTION

1. Field of the Invention

This invention relates to an image reproducing apparatus, and more particularly, to an apparatus for obtaining an image signal by decoding a compressed image signal subjected to block encoding.

2. Description of the Related Art

Digital VCR's (video cassette recorders) for recording/reproducing an image signal as a digital signal by digitizing an analog signal are generally known as typical apparatuses having the above-described function. In such VCR's, particular reproducing processing (particularly high-speed search) is indispensable, and excellent retrieval capability is required for such processing.

FIG. 1 illustrates loci of a head which traces a recording track recorded on a magnetic tape at a plurality of reproducing speeds including such a high-speed search. In FIG. 1, a large number of tracks are formed on a magnetic tape T. Each track includes a region V where a digital image signal is recorded, a region A where a digital sound signal is recorded, a region S where a subcode signal is recorded, and a region P where parity, used when error correction encoding has been performed, is recorded.

In FIG. 1, if if the reproducing speed S in a normal reproducing operation equals S=1 (no dimension), "a" indicates the scanning locus of the head at S=1, i.e., in the normal reproducing operation, "b" indicates the scanning locus of the head at S=5–15, i.e., in low-speed search having a speed of 5–15 times the speed in the normal reproducing operation, and "c" indicates the scanning locus of the head at S=50–100, i.e., in high-speed search having a speed of 50–100 times the speed in the normal reproducing operation. As is apparent from FIG. 1, when S=1, the head correctly traces the recording track. As the reproducing speed S increases, the head performs tracing across recording tracks.

As described above, the tracking angle of the head in a reproducing operation coincides with that in a recording operation only when S=1, i.e., in a normal reproducing operation. In such a case, the head traces the entire region of the recording track without crossing other recording tracks.

However, in cases other than S=1, such as cases b and c, the head performs tracing across a plurality of recording tracks. When the head performs a tracing/reproducing operation of a recording track whose azimuth is different from that of the head, the level of the obtained reproduced signal decreases.

As a result, every time the head traces each recording track, the level of the reproduced signal increases or decreases, so that, as shown in FIG. 2, the envelope of the reproduced signal becomes rhombic. That is, while a recorded signal can be completely reproduced at a standard speed, a portion of the signal which cannot be reproduced increases as the search speed increases, and finally, the level of the reproduced signal becomes below the visual tolerance limit.

SUMMARY OF THE INVENTION

It is an object of the present invention to solve the above-described problems.

It is another object of the present invention to provide an apparatus which can reproduce an excellent image signal even if a reproducing speed S increases.

According to one aspect, the present invention, which achieves these objectives, relates to a reproducing apparatus comprising reproducing means for reproducing an image signal, evaluation means for evaluating the quality of an image represented by the image signal reproduced by the reproducing means, and control means for controlling the reproducing means based on the evaluation of the evaluation means.

According to another aspect, the present invention relates to a reproducing apparatus comprising reproducing means for reproducing an image signal, setting means for setting the quality of a reproduced image, evaluation means for evaluating the quality of an image represented by the image signal reproduced by the reproducing means, and control means for controlling the reproducing means based on the picture quality set by the setting means and the evaluation of the evaluation means.

It is still another object of the present invention to provide an image reproducing apparatus which excellently operates even during retrieval, such as high-speed reproducing processing.

According to still another aspect, the present invention, which achieves the above-described object, relates to an image signal reproducing apparatus having a plurality of reproducing modes comprising reproducing means for reproducing an image signal and a subcode signal relating to the image signal. The reproducing means comprises a signal processing circuit for performing predetermined processing for the image signal. The apparatus further comprises setting means for setting the quality of a reproduced image, evaluation means for evaluating the quality of an image represented by the image signal reproduced by the reproducing means, and control means for switching the reproducing mode based on the picture quality set by the setting means and the evaluation of the evaluation means.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

A preferred embodiment of the present invention will now be described in detail with reference to the drawings.

Figure 3:
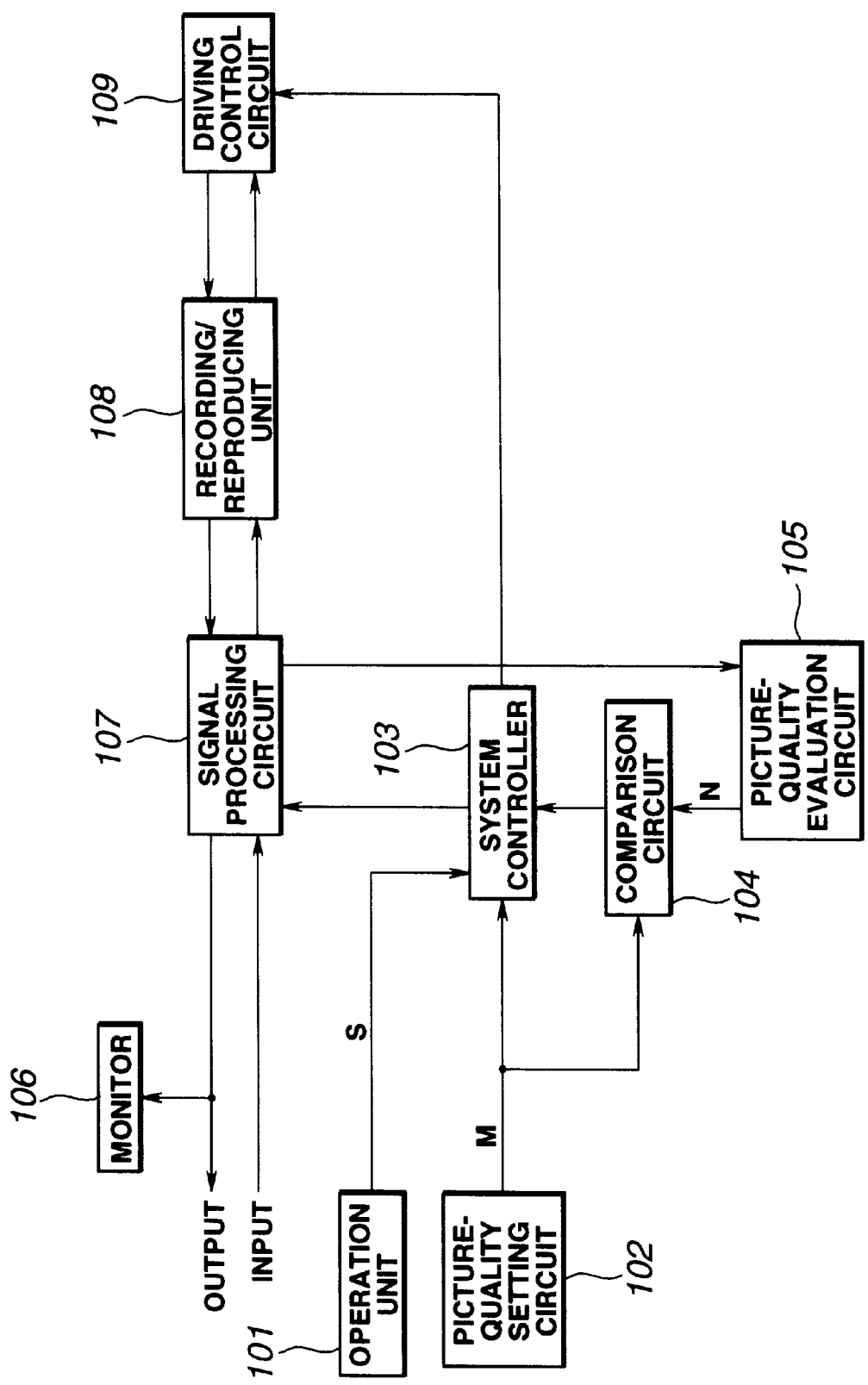
FIG. 3 is a block diagram illustrating the configuration of a digital VCR according to an embodiment of the present invention.

First, a description will be provided of processing of a reproduced signal and the control of a reproducing speed based on the quality of a reproduced image in a digital VCR according to the embodiment with reference to FIG. 3.

FIG. 3 is a block diagram illustrating the configuration of a digital VCR of the embodiment. In FIG. 3, an image/audio signal input from the outside is subjected to processing (to be described later) by a signal processing circuit 107, and is recorded on a magnetic tape (not shown) in a recording-reproducing unit 108. The signal reproduced from the tape is subjected to processing necessary for reproduction (to be described later) by the signal processing circuit 107, and is output to a monitor 106 and any external apparatus. The operation of the signal processing circuit 107 will now be described.

Figure 4:
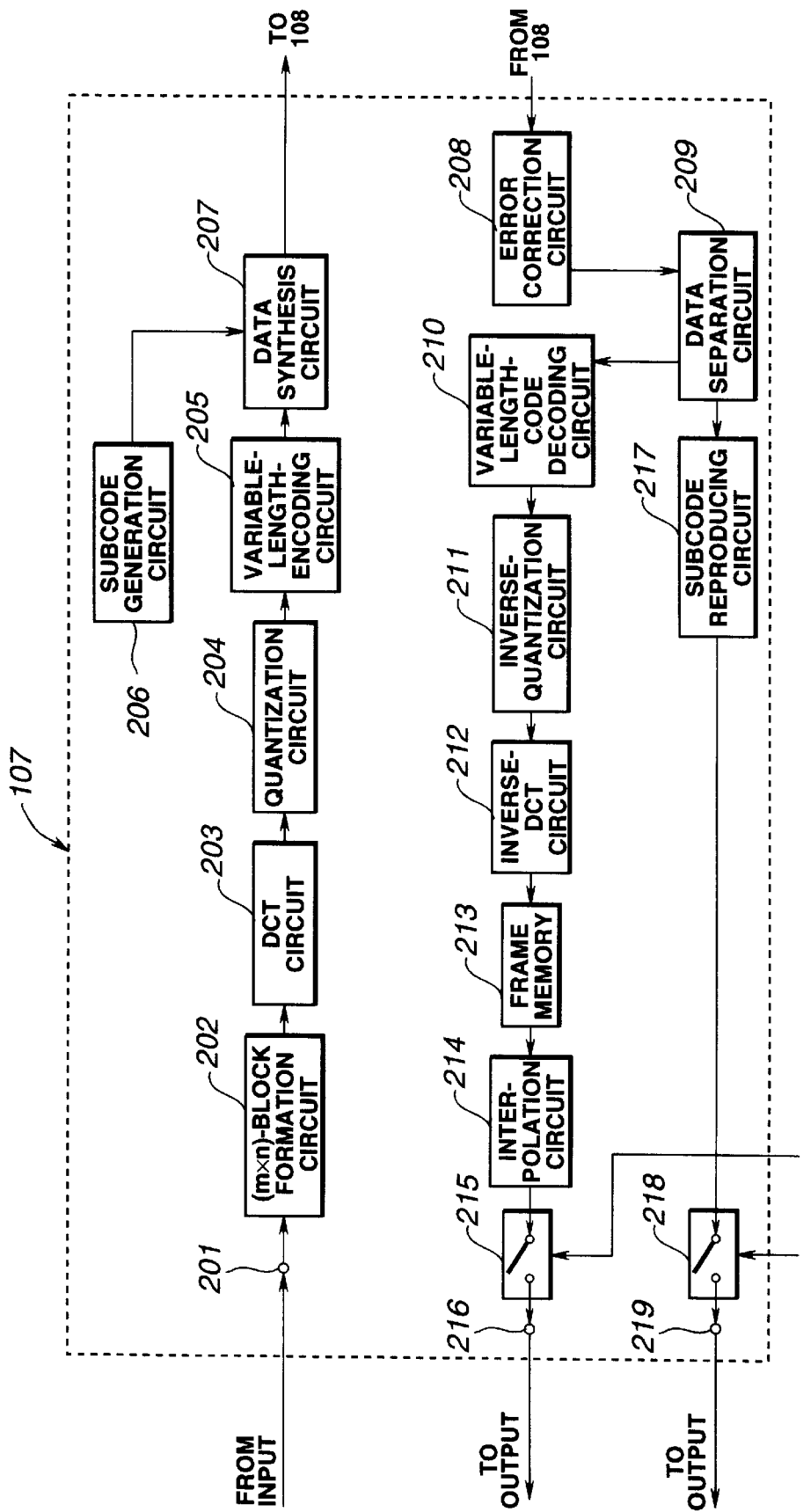
FIG. 4 is a block diagram illustrating the configuration of a signal processing circuit shown in FIG. 3.

FIG. 4 is a block diagram illustrating the configuration of the signal processing circuit 107. A description will only be provided of image signal processing, and a description of an audio signal processing will be omitted.

A digitized image signal is input to an input terminal 201, is divided in units of a block (comprising, for example, 8 pixels×8 pixels) by a block formation circuit 202. The image signal in units of a block is converted from data in a space region into data in a frequency region by a DCT (discrete cosine transform) circuit 203. The image signal converted in the frequency region is quantized by a quantization circuit 204, is then encoded by a variable-length-encoding circuit 205, and is output to a data synthesis circuit 207. A subcode generation circuit 206 generates a subcode signal indicating data relating to the input image signal, such as a title, a time code and the like, and outputs the generated subcode signal to the data synthesis circuit 207. The data synthesis circuit 207 synthesizes the image signal and the subcode signal, and outputs the resultant signal to the recording-reproducing unit 108.

In reproducing processing, the signal including the image signal and the subcode signal reproduced from the recording-reproducing unit 108 is input to an error correction circuit 208, which corrects error codes and outputs the signal after error correction to a data separation circuit 209. The data separation circuit 209 separates the image signal and the subcode signal from the input signal, and outputs the separated signals to a variable-length-code decoding circuit 210 and a subcode reproducing circuit 217, respectively. The subcode reproducing circuit 217 converts the input subcode signal into a signal having a form suitable for being output, and outputs the resultant signal from an output terminal 219 to the outside via a switch 218 controlled by a system controller 103, as will be described later.

The image signal output to the variable-length-code decocing circuit 210 is decoded thereby, and the decoded signal is subjected to inverse quantization by an inverse-quantization circuit 211. The inversely quantized signal is then subjected to inverse DCT by an inverse-DCT circuit 212, so that data in the frequency region is converted into data in the space region, and the signal is written in a frame memory 213. The image signal written in the frame memory 213 is read, for example, in synchronization with raster scanning of the monitor 106. An interpolation circuit 214 interpolates uncorrectable error data in the image signal. The image signal after interpolation is output from an output terminal 216 to the outside via a switch 215 also controlled by the system controller 103.

Next, a description will be provided of the operation in reproducing processing. In reproducing processing, a signal representing a reproducing speed S is first output from an operation unit 101 to the system controller 103. More specifically, various kinds of modes, such as a normal reproducing mode, a high-speed search mode, a low-speed search mode, a slow reproducing mode, a reverse search mode, a reverse reproducing mode, and the like, are switched by a switch, and the signal S corresponding to each mode is output. In the present embodiment, in the high-speed search mode, the tape is moved at a speed ten times the speed in the normal reproducing operation, and the in the low-speed search mode, the tape is moved at a speed 50 times the speed in the normal reproducing operation. As will be described later, a value M relating to the quality of the reproduced image is set by a picture-quality setting circuit 102, and is output to the system controller 103. The system controller 103 outputs the signal representing the reproducing speed S to a driving control circuit 109.

The driving control circuit 109 for controlling the recording-reproducing unit 108, including an electromagnetic conversion system, a loading mechanism and the like, controls the recording/reproducing unit 108 based on the signal representing the reproducing speed S, and the magnetic tape is fed at a predetermined speed. The set value M is also output to a comparison circuit 104. The comparison circuit 104 compares an evaluation value N output from a picture-quality evaluation circuit 105 (to be described later) with the set value M, and outputs the result of the comparison to the system controller 103 and the signal processing circuit 107. The system controller 103 switches the switches 215 and 218 in the signal processing circuit 107 based on the result of the comparison.

The picture-quality evaluation circuit 105 detects the state of degradation of the reproduced signal, and outputs the evaluation value N for determining whether or not the image signal is to be output to the outside, in accordance with the reproduced state (the state of degradation) of the signal. As will be described later, the evaluation value N may, for example, comprise the level of the reproduced signal, the number of sync blocks included in the reproduced signal, the error rate of codes of the reproduced signal, or the like. If the evaluation value N is less than the set value M, it is determined that the image is greatly degraded. In such a case, the image signal is not output irrespective of the reproducing speed S, and various kinds of useful subcodes including a time code are output, and information relating to the subcodes is displayed on the monitor 106 (This case will be hereinafter termed "a first mode"). If the evaluation value N is greater than or equal to the set value M, it is determined that the reproduced image is good enough to observe. In such a case, the image signal is output without modification, and the reproduced image is displayed on the monitor 106 (This case will be hereinafter termed "a second mode").

Figure 5:
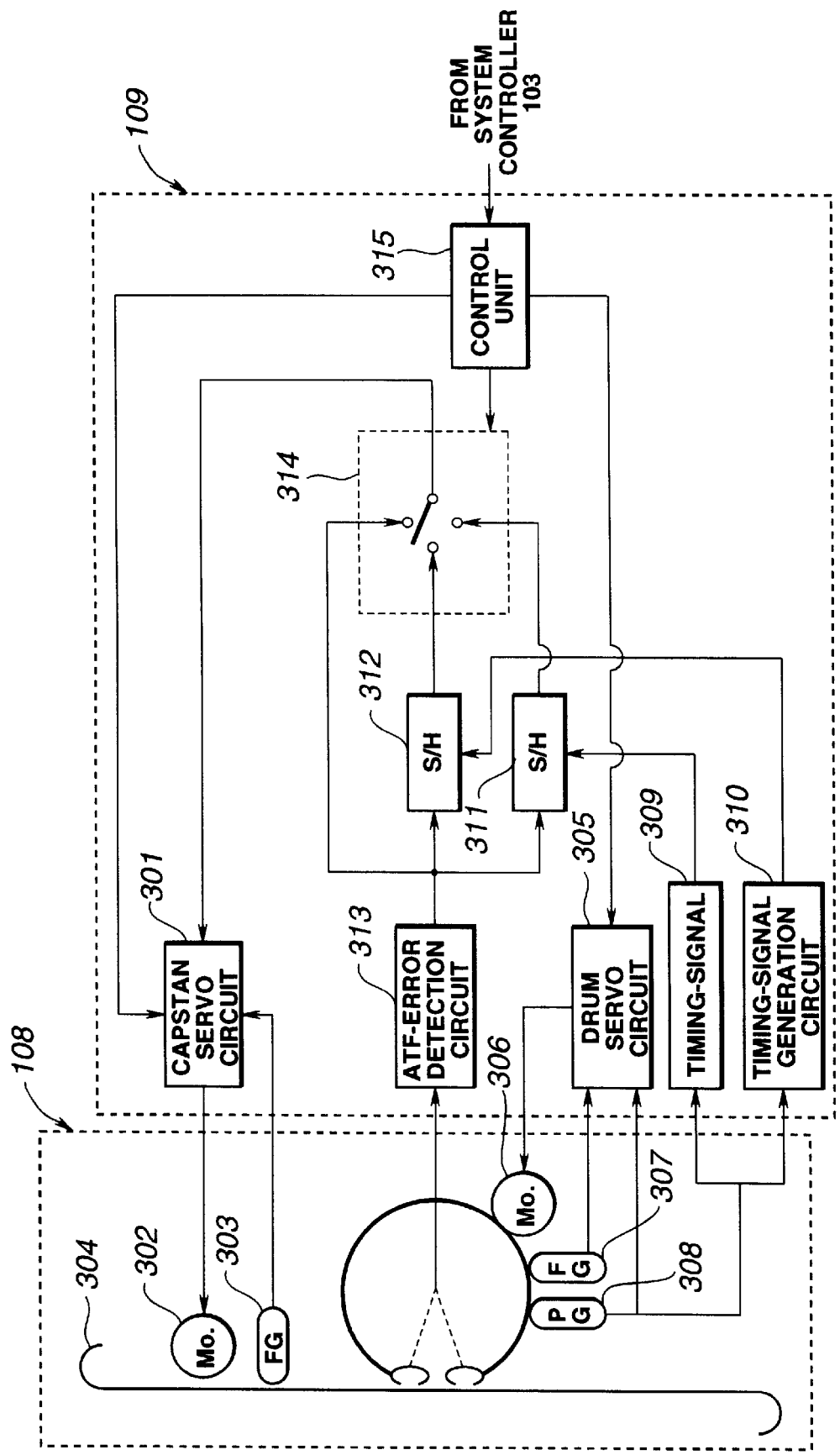
FIG. 5 is a block diagram illustrating the configuration of a recording/reproducing circuit and a driving control circuit of the apparatus shown in FIG. 3.

Next, a description will be provided of the switching of the mode of the apparatus by the driving control circuit 109 based on the set value M with reference to FIG. 5. FIG. 5 is a block diagram illustrating the configuration of the recording/reproducing circuit 108 and the driving control circuit 109.

The set value M and the signal representing the reproducing speed S are output from the picture-quality setting circuit 102 and the operation unit 101, respectively, to the system controller 103. The system controller 103 outputs the signal representing the reproducing speed S to a control unit 315 in FIG. 5. The control unit 315 controls a capstan servo circuit 301 based on the signal representing the reproducing speed S. The system controller 103 also outputs a control signal for a switch 314, based on the result of the comparison of the comparison circuit 104, to the control unit 315. The control unit 315 controls the switch 314 based on the control signal. The control unit 315 also controls a drum servo circuit 305.

The capstan servo circuit 301 rotates a capstan (not shown) at the reproducing speed S, and controls a capstan motor 302 based on a capstan FG signal corresponding to the rotating speed of the capstan detected by a capstan FG detection circuit 303, to perform well-known capstan servo processing. The drum servo circuit 305 controls a drum motor based on a drum FG signal and a drum PG signal from a drum FG detection circuit 307 and a drum PG detection circuit 308, respectively, to perform well-known drum servo processing.

The drum PG detection circuit 308 also outputs the drum PG signal to timing-signal generation circuits 309 and 310. The timing-signal generation circuits 309 and 310 output timing signals in accordance with respective tape regions for subcodes, sound and an image, recorded on a magnetic tape 304.

Figure 6:
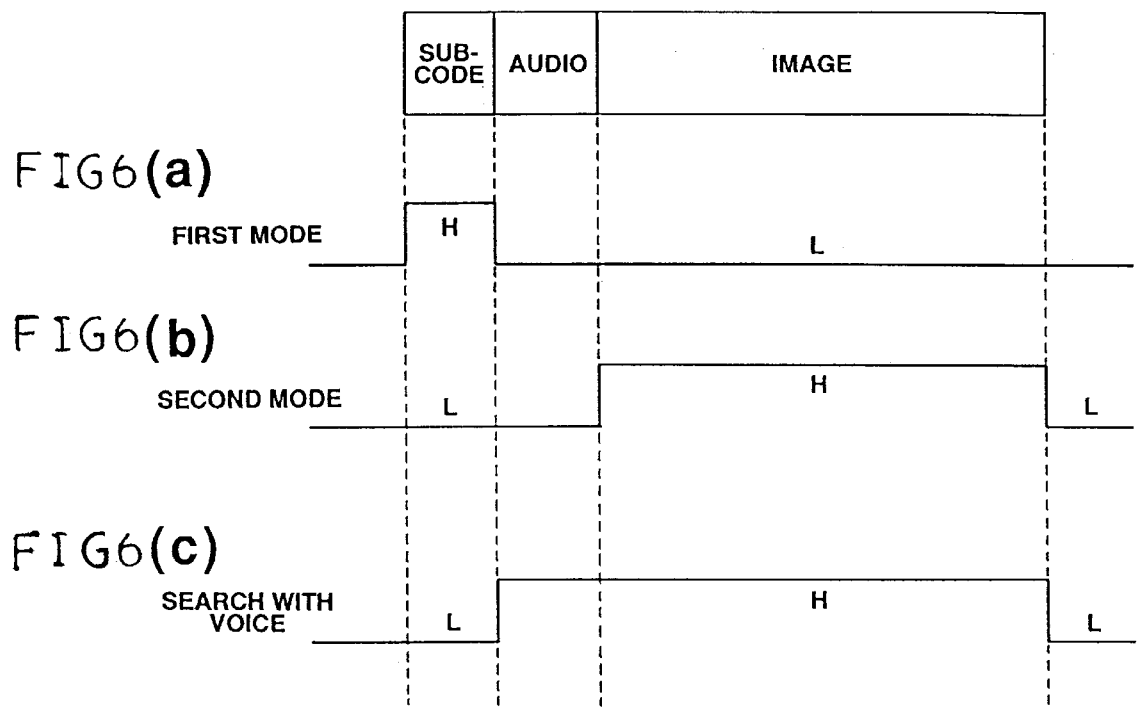
FIGS. 6A to 6C are timing charts illustrating the operations in FIG. 5.

FIG. 6 illustrates timing signals output from the timing-signal generation circuits 309 and 310. In the first mode, subcode information is output without outputting an image signal. Hence, as shown in FIG. 6(a), the timing signal is made high only in the subcode region. In the second mode, an image signal can be output. Hence, as shown in FIG. 6(b), the timing signal is made high only in the image region. In low-speed search in which the reproducing speed is about twice the normal speed, sound can also be reproduced. Hence, as shown in FIG. 6(c), the timing signal may be made high in the audio region as well as in the image region.

Such timing signals in respective modes are output to S/H (sample-and-hold) circuits 312 and 311. The S/H circuit 311 corresponds to the first mode, and performs opening/closing of its S/H gate with the timing shown in FIG. 6(a) output from the timing-signal generation circuit 309. The S/H circuit 312 corresponds to the second mode, and performs opening/closing of its S/H gate with the timing shown in FIG. 6(b) output from the timing-signal generation circuit 310. The gate is opened at high, and closed at low.

Figure 1:
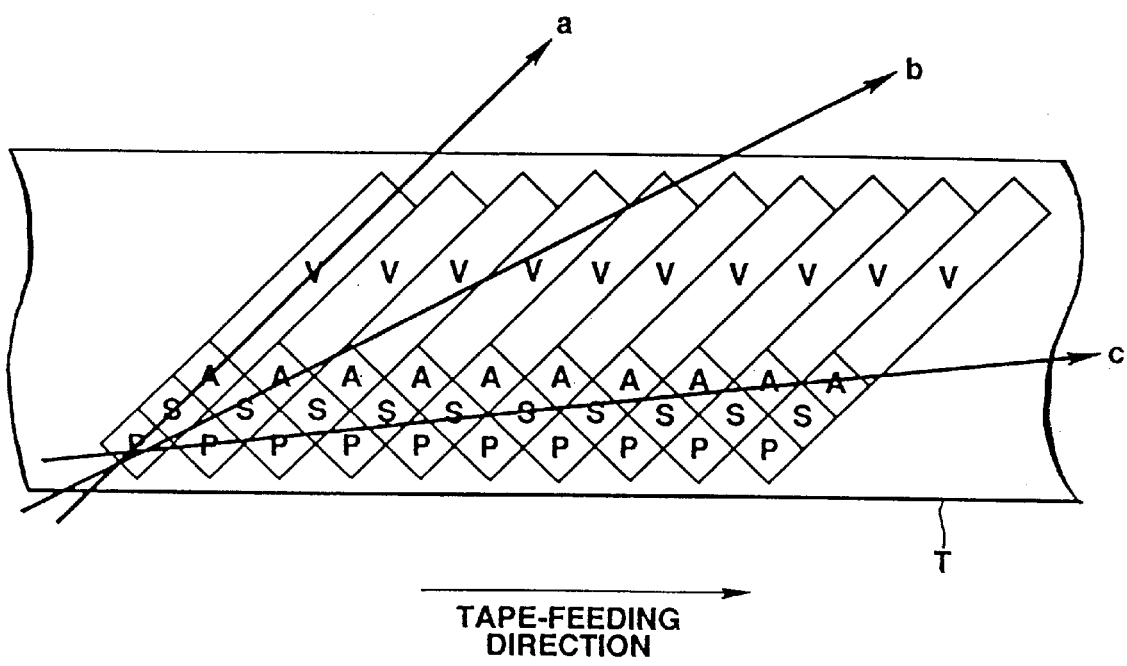
FIG. 1 is a diagram illustrating recording tracks and traces of a head in a digital VCR.

An ATF-error detection circuit 313 detects a pilot signal component of an image signal, an audio signal, and a subcode signal recorded on each track shown in FIG. 1, and outputs an ATF-error signal indicating a tracking error. The AFT-error signal reaches the switch 314 when the above-described gate is "opened". The switch 314 is controlled by the control unit 315 in response to a control signal from the system controller 103, and is switched in accordance with the first mode and the second mode in normal reproducing processing. The capstan servo circuit 301 performs well-known capstan servo control using a pilot error signal in each mode selected by the switch 314. According to the above-described configuration, in the first mode during search, servo control is performed so as to reproduce only subcodes. In the second mode, servo control is performed so as to reproduce only an image signal.

As described above, in the first mode, i.e., when the evaluation value N, serving as the result of evaluation of the picture quality, is smaller than the set value M, and the quality of the reproduced image is inferior, servo control is performed by the system controller 103 as shown in FIG. 6(a), so that only the subcode data can be reproduced and displayed in an excellent manner.

In the second mode, i.e., when the evaluation value N is greater than the set value M, and the quality of the reproduced image is excellent, servo control is performed by the system controller 103 as shown in FIG. 6(b), so that only the image data can be reproduced and displayed in an excellent manner.

Next, a description will be provided of the picture-quality evaluation circuit 105 which outputs the evaluation value N, serving as a determination criterion for degradation of the reproduced signal at the reproducing speed. As described above, the evaluation value N comprises, for example, the level of the reproduced signal, the number of sync blocks included in the reproduced signal, or the error rate of codes of the reproduced signal. The relationship between these determination elements and the reproducing speed will now be described.

Figure 7:
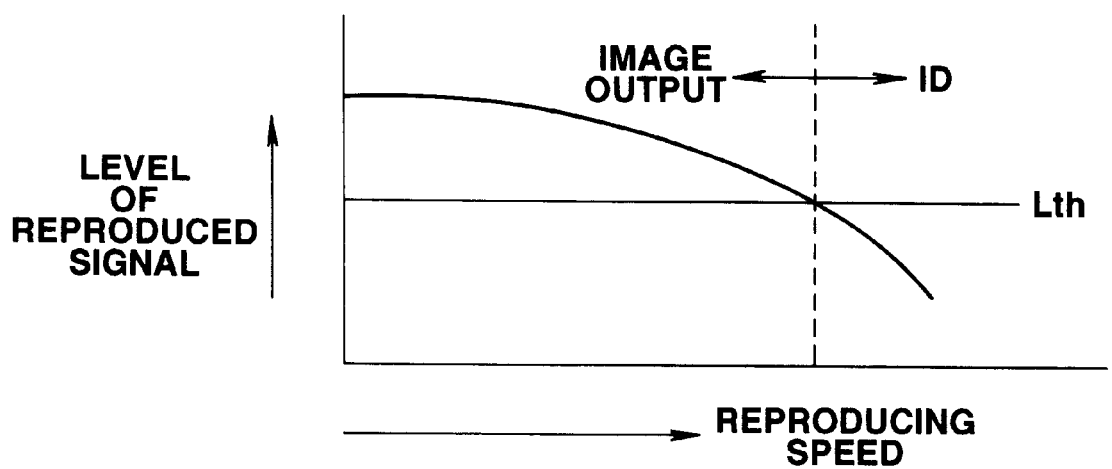
FIG. 7 is a diagram illustrating the relationship between the reproducing speed and the level of the reproduced signal.

FIG. 7 illustrates the relationship between the reproducing speed and the level of the reproduced signal. In FIG. 7, the abscissa represents the reproducing speed, and the ordinate represents the integrated value of the level of the reproduced signal (which corresponds to the area of rhombic portions above the amplitude A shown in FIG. 2). In FIG. 7, the left end corresponds to normal reproducing processing having a value of S=1. The level of the reproduced signal in this case is made a reference level (100%). As is apparent from FIG. 7, the level of the reproduced signal decreases as the reproducing speed S increases. When the level of the reproduced signal is below a certain level, the reproduced signal is greatly degraded, and the obtained image becomes very awkward. Accordingly, when the level of the reproduced signal is used as the evaluation value N, a circuit for detecting the level of the reproduced signal is used as the picture-quality evaluation circuit 105, and the level of the reproduced signal is output as the evaluation value N. If the limit level of the reproduced signal for providing an observable image is represented by Lth, the value Lth is set in the picture-quality setting circuit 102 as the set value M. The detected level N of the reproduced signal is compared with the value Lth, and it is determined if the corresponding image must be output based on the result of the comparison. That is, if the level of the reproduced signal is greater than the value Lth, the image signal is output, and search is performed while observing the obtained image. If the level of the reproduced signal is less than the value Lth, the image signal is not output as described above, and search is performed while displaying the contents of subcodes.

Next, a description will be provided of the relationship between the reproducing speed and the number of sync blocks included in the reproduced signal.

Figure 8:
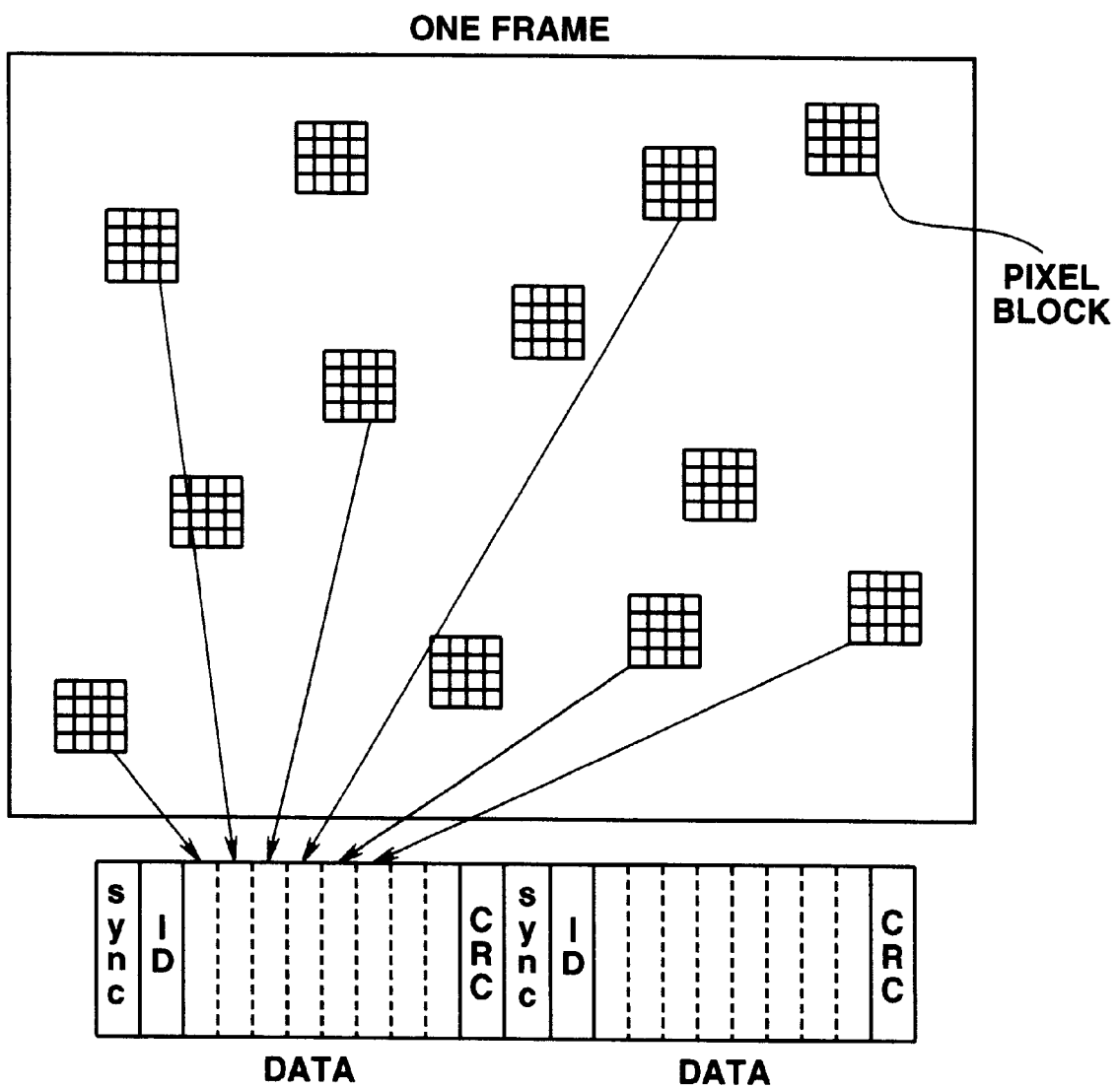
FIG. 8 is a diagram illustrating the configuration of sync blocks in the embodiment.
Figure 9:
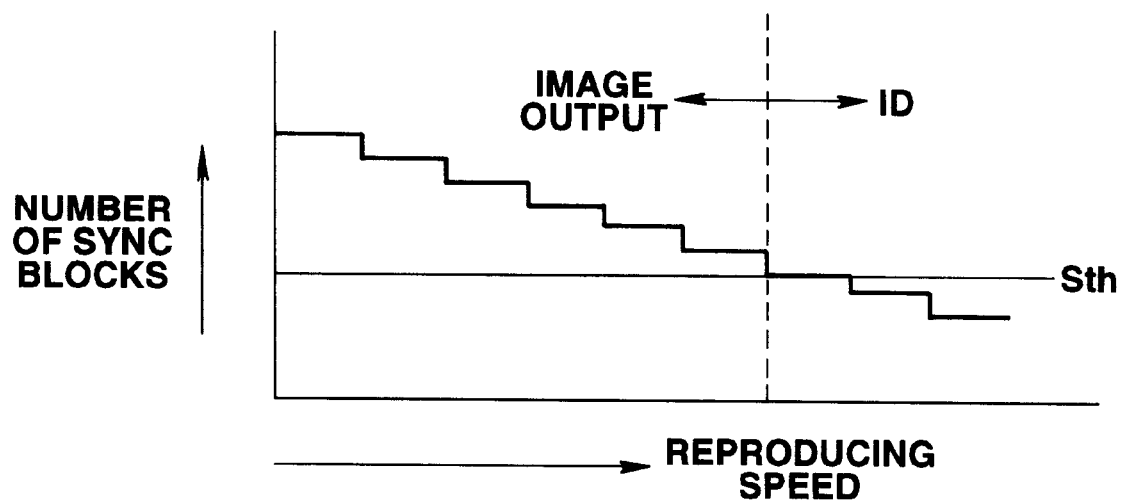
FIG. 9 is a diagram illustrating the relationship between the reproducing speed and the number of sync blocks included in the reproduced signal.

Usually, in digital VCR's, data subjected to block encoding is stored in sync blocks having a predetermined size, and recording/reproducing processing is performed in units of a sync block. As shown in FIG. 8, when storing pixel blocks in one sync block, in order to prevent the occurrence of large variations in the amount of codes of data subjected to variable-length-encoding, pixel blocks are extracted from a plurality of positions separated from each other within one picture frame, and are stored in the sync block. Accordingly, a missing portion in image information is great and a certain degree of picture quality cannot be obtained unless a certain number of sync blocks is reproduced. FIG. 9 illustrates the relationship between the reproducing speed and the number of sync blocks included in the reproduced signal (which corresponds to the number of sync blocks included in rhombic portions above the amplitude A shown in FIG. 2). As is apparent from FIG. 9, in normal reproducing processing, since the head exactly traces tracks, the number of reproduced sync blocks has a maximum value. The number then decreases as the reproducing speed increases. When the number becomes less than a certain number, the number of reproduced pixel blocks considerably decreases, so that the obtained image is greatly degraded. Accordingly, when the number of sync blocks in the reproduced signal is used as the evaluation value N, a circuit for detecting the number of sync blocks is used as the picture-quality evaluation circuit 105, and the number of sync blocks in the reproduced signal is detected as the evaluation value N. If the limit number of sync blocks in the reproduced signal for providing an observable image is represented by Sth, the value Sth is set in the picture-quality setting circuit 102 as the set value M. The detected level of the reproduced signal N is compared with the value Sth, and it is determined if the obtained image must be output based on the result of the comparison, in the above-described manner.

Next, a description will be provided of the relationship between the reproducing speed and the error rate of codes of the reproduced signal.

Figure 10:
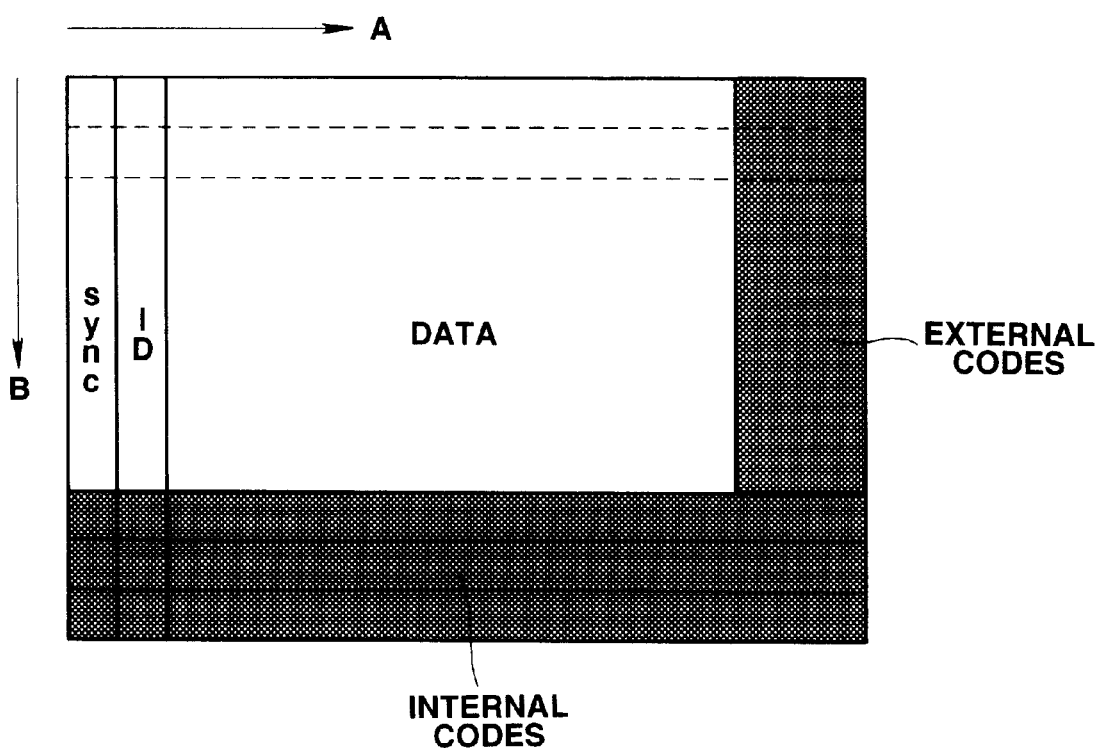
FIG. 10 is a diagram illustrating a recording format of data in the embodiment.

FIG. 10 illustrates a recording format for data in the present embodiment. Usually, in digital VCR's, as shown in FIG. 10, external codes and internal codes are added to data, such as encoded image data or the like. A sync block (comprising ID data indicating the contents of the data) and a sync signal are also added in order to perform recording while performing error correction encoding. Error codes in the reproduced data are corrected using error-correcting codes. The error rate of codes in the reproduced signal generally depends on the amplitude level of the reproduced signal. Hence, portions above a predetermined amplitude level are reproduced as portions having low error rates. Since the permissible code error rate is determined in consideration of the transmission system being used, the predetermined amplitude level is set based on the permissible error rate.

Figure 2:
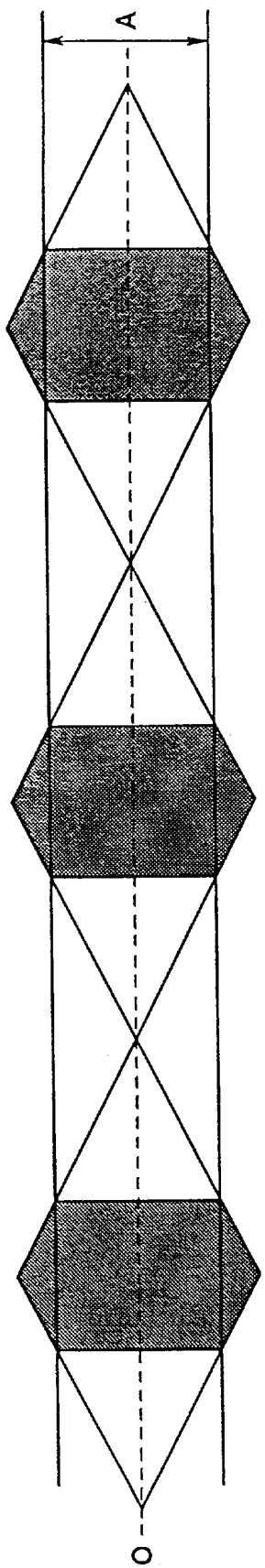
FIG. 2 is a diagram illustrating a reproduced signal during search.
Figure 11:
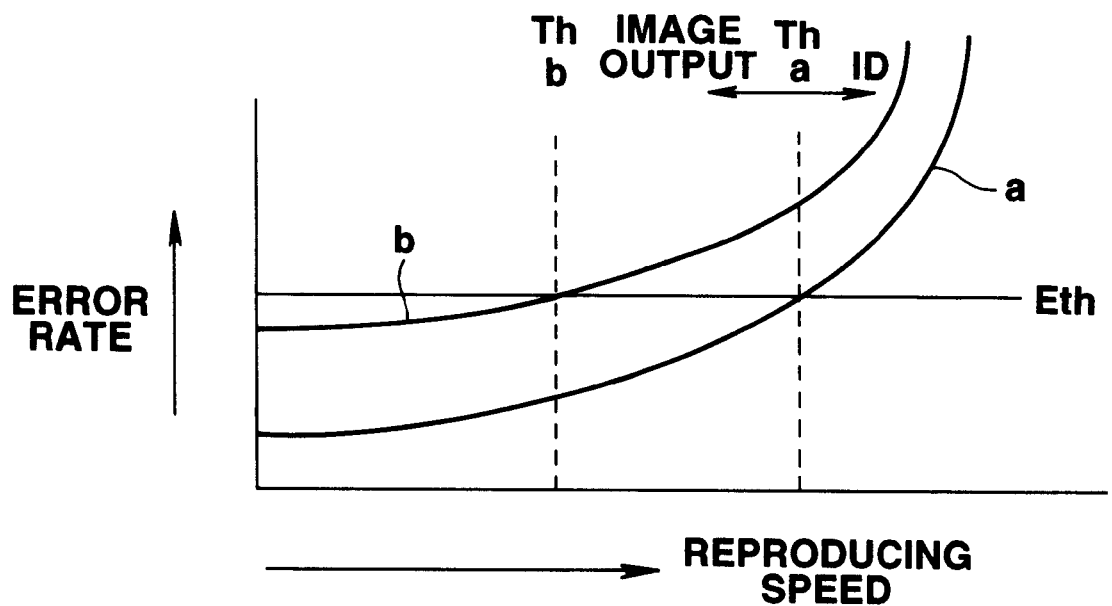
FIG. 11 is a diagram illustrating the relationship between the reproducing speed and the error rate in the reproduced signal.

Portions above the amplitude A shown in FIG. 2 have low code error rates. Excellent reproducing processing is performed for these portions. Portions satisfying this amplitude condition decrease as the reproducing speed increases. Hence, the code error rate in the reproduced signal increases. FIG. 11 illustrates such a tendency. In FIG. 11, the abscissa represents the reproducing speed, and the ordinate represents the error rate of codes of the reproduced signal. In FIG. 11, curve "a" indicates the code error rate when error correction encoding is performed, and curve "b" indicates the code error rate when error correction encoding is not performed. That is, if the error rate for obtaining predetermined picture quality is represented by Eth, and the curves "a" and "b" are compared with each other with respect to the value Eth, it can be understood that an image having the predetermined picture quality can be obtained at a greater reproducing speed for the curve "a", i.e., when error correction encoding is performed. When the above-described error rate of codes of the reproduced signal is used as the evaluation value N, a circuit for detecting the code error rate is used as the picture-quality evaluation circuit 105, and the error rate of codes of the reproduced signal is used as the evaluation value N. The value Eth is set in the picture-quality setting circuit 102 as the set value M. The detected level N of the reproduced signal is compared with the value Eth, and it is determined if the obtained image is to be output based on the result of the comparison.

It is possible to select the most suitable circuit from among the above-described circuits for detecting the level of the reproduced signal, for detecting the number of sync blocks included in the reproduced signal, and for detecting the error rate of codes of the reproduced signal as the picture-quality evaluation circuit 105 shown in FIG. 3.

Figure 12:
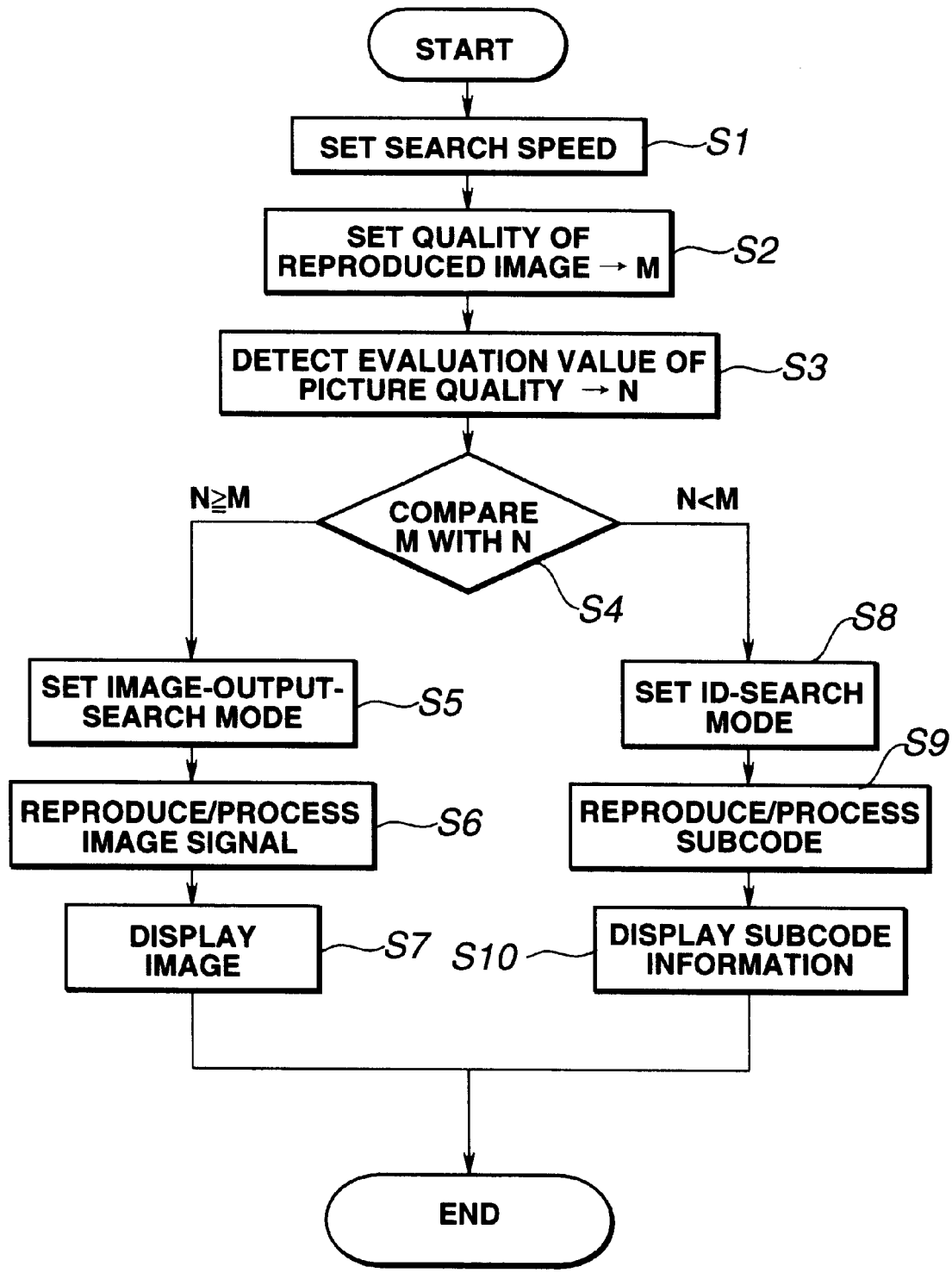
FIG. 12 is a flowchart illustrating the operation of the apparatus shown in FIG. 3.

Next, a description will be provided of mode discrimination during search and control procedures for the discrimination with reference to the flowchart shown in FIG. 12.

First, a search speed is set through the operation unit 101 (step S1), and the quality of the reproduced image is set by the picture-quality setting circuit 102 (step S2). The system controller 103, which has received a reproducing command from the operation unit 101, controls the driving control circuit 109 to reproduce a signal recorded on the tape. When the image signal recorded on the tape has been reproduced, the picture-quality evaluation circuit 105 outputs the above-described picture-quality evaluation value N to the comparison circuit 104 (step S3).

The comparison circuit 104 compares the evaluation value N with the set value output from the picture-quality setting circuit 102 (step S4).

If N≧M, the system controller 103 makes the mode of the apparatus an image-output-search mode (step S5), closes both the switches 215 and 218 in the signal processing circuit 107, performs the above-described processing for the reproduced image signal and subcode signal, and outputs the resultant signal to the monitor 106 (step S6). The monitor 106 displays an image and subcode information relating to the output image signal (step S7).

If N<M in step S4, the system controller 103 sets the mode of the apparatus to an ID-search mode (step S8), and reproduces/processes only subcodes from the tape (step S9). By opening the switch 215 and closing the switch 218, the system controller 103 causes the monitor 106 to display only subcode information (step S10).

As described above, in the present embodiment, it is determined if the image signal is to be output during search at an arbitrary reproducing speed, based on the relationship between a determination element relating to the quality of the reproduced image, and the reproducing speed. Accordingly, when the reproducing speed increases and predetermined picture quality cannot be obtained, the obtained image is not output and only the contents of subcodes are displayed, so that the operability of the apparatus during search can be improved. It is possible to select the most suitable determination element, for example, from among the level of the reproduced signal, the number of sync blocks included in the reproduced signal, and the error rate of codes of the reproduced signal.

In the present embodiment, since servo characteristics are appropriately switched for a mode of outputting an image and for a mode of performing search while displaying only subcodes, the most suitable search characteristics can be provided for each mode.

In another embodiment of the present invention, an image may always be output during search, and search may be performed at the highest speed with which an image can be output, i.e., at the highest speed with which the evaluation value N is not less than the set value M. In such a case, since the minimum level of the quality of an image being retrieved is maintained, a digital VCR can be used without causing the user, who is accustomed to conventional analog VCR's, to find awkwardness in the picture quality, such as degradation of a signal, caused by compression, which is apt to occur in digital VCR's. Set values M may be set in accordance with a plurality of picture-quality levels, i.e., a plurality of values Lth shown in FIG. 7 may be provided when the level of the reproduced signal is selected as the determination element. Also in such a case, search can be performed at the highest speed for each picture-quality level.

Although in the present embodiment a searching operation is controlled by controlling the reproducing speed of the tape, the reproducing speed of the tape may be assigned by the operator, and the relative speed between the head and the tape may be confirmed through the obtained image by controlling the rotating speed of the head. This approach can be realized by controlling the drum motor 306 shown in FIG. 5 by the output of the picture-quality evaluation circuit 105 shown in FIG. 3. Thus, the obtained image can be confirmed at the reproducing speed assigned by the operator with high probability.

In the above-described embodiment, one of a circuit for detecting the level of the reproduced signal, a circuit for detecting the number of sync blocks included in the reproduced signal, and a circuit for detecting the error rate of codes of the reproduced signal is used as the picture-quality evaluation circuit. However, a plurality of these circuits may be provided and one of them may be selectively used. Furthermore, a plurality of results of evaluation from these circuits may be used.

In the above-described embodiment, an image signal and a subcode signal are output to the monitor in the form of digital signals. However, when a digital input terminal is not present in the monitor, an A/D converter may be provided and the signals may be output after being converted into analog signals.

The individual components shown in outline or designated by blocks in the drawings are all well known in the image reproducing apparatus arts and their specific construction and operation are not critical to the operation or the best mode for carrying out the invention.

While the present invention has been described with respect to what is presently considered to be preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus having a normal reproduction mode and a high-speed reproduction mode, comprising:
reproducing means for reproducing a digital image signal from a recording medium;
moving means for moving the recording medium, said moving means moving the recording medium at a speed corresponding to a speed of recording the digital signal in the normal reproduction mode, said moving means moving the recording medium at a faster speed than the speed of recording the digital signal in the high-speed reproduction mode;
detection means for correcting code errors in the reproduced digital image signal and detecting an error rate of the reproduced digital image signal according to the error correction result; and
control means for controlling a moving operation of said moving means in the high-speed reproduction mode according to the error rate detected by said detection means.

2. An apparatus according to claim 1, wherein the reproduced signal comprises a plurality of sync-blocks, each of which includes a portion of the image signal which is divided into a plurality of blocks and is coded in block units, and a synchronizing signal.

3. An apparatus according to claim 2, further comprising error correction means for correcting errors in the reproduced image signal.

4. An apparatus according to claim 1, further comprising processing means for processing the reproduced image signal to output the reproduced image signal to a monitoring device, and wherein said control means controls said moving means to control a moving speed of the recording medium so that an image corresponding to the reproduced image signal can be monitored on the monitoring device.

5. A reproducing apparatus comprising:
reproducing means for reproducing from a recording medium a digital signal including an image signal and a subordinate signal relating to the image signal;
moving means for moving the recording medium;
detection means for correcting code errors in the reproduced image signal and detecting an error rate of the reproduced image signal according to the error correction results; and
mode changing means for changing a search reproduction mode of the apparatus among a plurality of search reproduction modes according to the error rate detected by said detection means, the plurality of search reproduction modes including a first search reproduction mode, in which said moving means moves the recording medium at a faster speed than a speed of recording the digital signal and in which said reproduction means reproduces the image signal, and a second search reproduction mode, in which said moving means moves the recording medium at a faster speed than the speed of recording the digital signal and in which said reproducing means does not reproduce the image signal and reproduces the subordinate signal.

6. A reproducing apparatus having a normal reproduction mode and a high-speed reproduction mode, comprising:
reproducing means for reproducing a digital image signal from a recording medium;
moving means for moving the recording medium, said moving means moving the recording medium at a speed corresponding to a speed of recording the digital image signal in the normal reproduction mode, said moving means moving the recording medium at a faster speed than the speed of recording the digital signal in the high-speed reproduction mode;
detection means for correcting code errors in the reproduced digital image signal and detecting a low reliability in the reproduced digital image signal according to the correction result; and
control means for controlling a moving operation of said moving means in the high-speed reproduction mode according to a detection result of said detection means.

7. An apparatus according to claim 6, wherein said control means controls said moving means to change a moving speed of the recording medium according to the detection result of said detection means.

8. An apparatus according to claim 7, further comprising manual setting means for manually setting a reference reliability of the reproduced image data, and wherein said control means controls the moving means so as to move the recording medium at a highest speed at which the reference reliability set by said manually setting means can be kept.

9. An apparatus according to claim 6, wherein in the normal reproduction mode said moving means moves the recording medium at a speed at which the image signal is recorded, and in the high-speed reproduction mode said moving means moves the recording medium at a faster speed than the speed at which the image signal is recorded.

10. An apparatus according to claim 6, wherein said control means includes comparing means for comparing the error rate detected by said detection means with a threshold value.

11. An apparatus according to claim 10, wherein said control mean is provided with a plurality of different threshold values.

12. An apparatus according to claim 10, wherein an error correction check code is added to the image signal, the image signal is error correction encoded with the error correction check code, and said detection means includes error correction means for error correction decoding the reproduced digital image signal.

13. An apparatus according to claim 6, wherein said control means controls a moving speed of the recording medium in the high-speed reproduction mode so that the image signal has a predetermined image quality when reproduced from the recording medium.

14. An apparatus according to claim 6, further comprising:

processing means for processing the reproduced image signal so that images represented by the image signal are capable of being monitored by a monitoring device; and output means for outputting the image signal processed by said processing means to the monitoring device.

15. An apparatus according to claim 14, wherein said control means controls an outputting operation of the processed image signal by said output means according to the detection result of said detection means.

16. A reproducing apparatus, comprising:

reproducing means for reproducing from a recording medium a digital signal including a main signal and a subordinate signal relating to the main signal;

moving means for moving the recording medium;

detection means for correcting code errors in the reproduced main signal and detecting an error rate of the reproduced main signal according to the error correction result; and mode changing means for changing a search reproduction mode of the apparatus among a plurality of search reproduction modes according to the error rate detected by said detection means, the plurality of search reproduction modes including a first search reproduction mode, in which said moving means moves the recording medium at a faster speed than a speed of recording the digital signal and in which said reproduction means reproduces the main signal, and a second search reproduction mode, in which said moving means moves the recording medium at a faster speed than the speed of recording the digital signal and in which said reproducing means does not reproduce the main signal and reproduces the subordinate signal.

17. An apparatus according to claim 16, further comprising processing means for processing the reproduced signal to output a processed signal to a monitoring device so that information corresponding to the reproduced signal is monitored in the monitoring device.

18. An apparatus according to claim 17, wherein said processing means processes the reproduced main signal and outputs a processed main signal to the monitoring device so that information corresponding to the reproduced main signal is monitored in the monitoring device in the first search reproduction mode, and said processing means further processes the reproduced subordinate signal and outputs a processed subordinate signal to the monitoring device so that information corresponding to the reproduced subordinate signal is monitored in the monitoring device in the second search reproduction mode.

19. An apparatus according to claim 18, wherein the main signal includes an image signal.

20. An apparatus according to claim 18, wherein said moving means moves the recording medium so that the error rate of the reproduced main signal is lower in the first search reproduction mode and so that the error rate of the reproduced other signal is lower in the second search reproduction mode.

21. An apparatus according to claim 20, wherein said reproducing means has a head for tracing a plurality of helical tracks formed on the recording medium to obtain the reproduced signal, and wherein said moving means includes means for obtaining a tracking error signal indicating an amount of deviation between the head and the helical track to be traced by the head by using the reproduced signal, sampling means for sampling the tracking error signal and servo means for moving the recording medium according to an output of said sampling means.

22. An apparatus according to claim 21, wherein said control means controls the moving operation by changing a sampling timing of said sampling means.

\* \* \* \* \*

UNITED STATES PATENT AND TRADEMARK OFFICE
CERTIFICATE OF CORRECTION

PATENT NO. : 6,137,951
DATED : October 24, 2000
INVENTOR(S) : Kenji Kawai et al.

It is certified that error appears in the above-identified patent and that said Letters Patent is hereby corrected as shown below:

Title page,
Item [56] References Cited, U.S. PATENT DOCUMENTS
"Inove et al." should read -- Inoue et al. --.

Column 1,
Line 28, "if if" should read -- if --.

Column 4,
Line 18, "the" (third occurrence) should be deleted.

Column 5,
Line 29, "Fig. 6 illustrates" should read -- FIGS. 6(a)-6(c) illustrate --.

Column 11,
Line 12, "mean" should read -- means --.

Signed and Sealed this

Twenty-sixth Day of February, 2002

*Attest:*

JAMES E. ROGAN
*Attesting Officer*    *Director of the United States Patent and Trademark Office*